July 12, 1960 R. C. RUSSELL 2,944,402
VARIABLE REACTOR HYDRAULIC TORQUE CONVERTER
Filed Aug. 29, 1957 2 Sheets-Sheet 1

INVENTOR.
ROBERT C. RUSSELL
BY Hudson, Boughton,
Williams, David & Hoffmann
ATTORNEYS

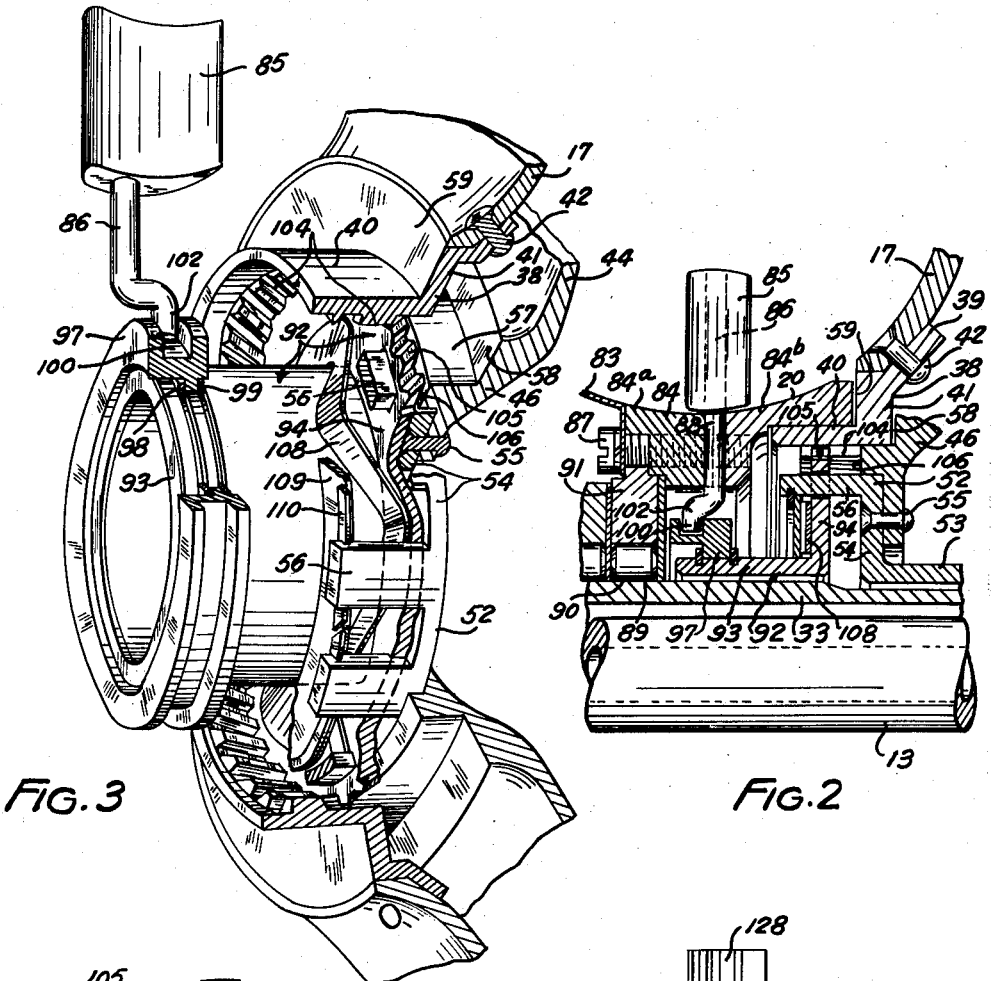
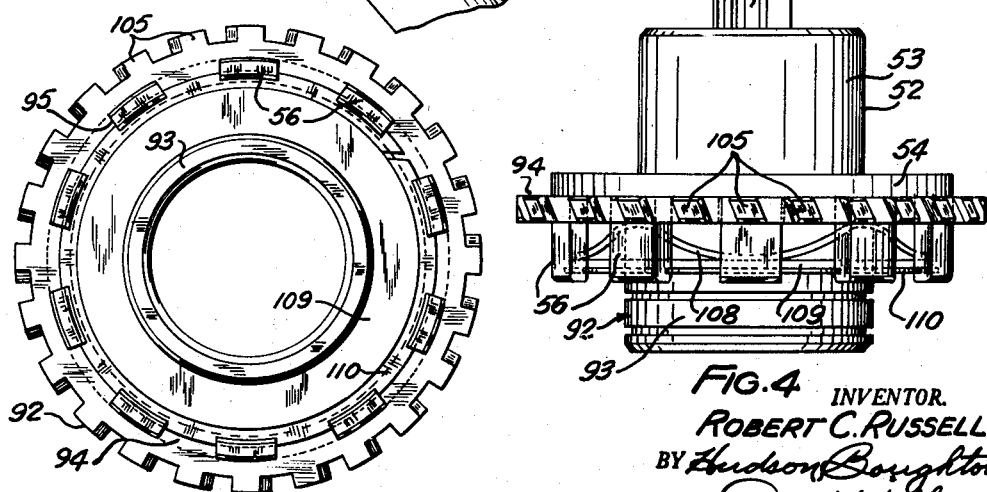

United States Patent Office 2,944,402
Patented July 12, 1960

2,944,402

VARIABLE REACTOR HYDRAULIC TORQUE CONVERTER

Robert C. Russell, Shaker Heights, Ohio, assignor to Eaton Manufacturing Company, Cleveland, Ohio, a corporation of Ohio Filed Aug. 29, 1957, Ser. No. 681,118

9 Claims. (Cl. 60—54)

This invention relates to power transmission mechanisms of the fluid torque converter type embodying cooperating relatively rotatable bladed annular members and, as one of its objects, provides a novel transmission of this type in which one of the bladed members has variable-pitch blade elements automatically shiftable to a pitch angle or setting most favorable to the load condition under which the transmission is operating at any given time.

Another object is to provide such a transmission having a pump member driven by a variable-torque input means and in which the shifting of the variable-pitch blade elements to different pitch settings is responsive to variations in the driving torque being transmitted to the pump member.

Still another object is to provide such a transmission in which the variable-pitch blade elements are a part of a reaction member, and which blade elements are shiftable toward a high fluid torque amplification setting in response to the application of a high value of input torque to the pump member and are shiftable toward a low fluid torque amplification setting in response to the application of a low value of input torque to the pump member.

A further object is to provide a vehicle transmission of the kind above indicated in which the shifting of the blade elements is by a modulating movement applied thereto throughout their range of pitch adjustment; and in which movement of the blade elements to or toward a low fluid torque amplification setting places them at a blade angle most favorable for an efficient functioning of the transmission during cruising operation of the vehicle with a low value of engine torque delivery, and movement and the blade elements to or toward a high fluid torque amplification setting places them at a blade angle most favorable for an efficient functioning of the transmission during acceleration of the vehicle in response to a high value of engine torque delivery.

Yet another object is to provide such a variable blade-pitch fluid torque converter in which a torque responsive means comprising helical thrust elements produces a control movement for shifting the blade elements, such that any desired point on a characteristic engine torque curve can be selected for the full pitch or high fluid torque amplification setting of the blade elements for producing maximum vehicle acceleration.

Additionally this invention provides such a variable blade-pitch torque converter in which a means, preferably a spring means, embodied in the torque responsive means causes the blade elements to be shifted back to the low fluid torque amplification setting corresponding with an efficient vehicle cruising condition of operation of the transmission when the need for rapid acceleration no longer exists.

Other objects and advantages of this invention will be apparent in the following detailed description and in the accompanying drawings forming a part of this specification and in which:

Fig. 2 is a partial vertical section corresponding with a portion of Fig. 1 and showing the variable-pitch blade elements in their vehicle accelerating or high fluid torque amplification setting;

Fig. 3 is a perspective view, somewhat diagrammatic in form and with portions in section, further illustrating this novel transmission;

Fig. 4 is a plan view, in detached relation, showing the shiftable control member of the transmission and the hub supporting the same; and Fig. 5 is an end view of such control member and support hub.

Figure 1:
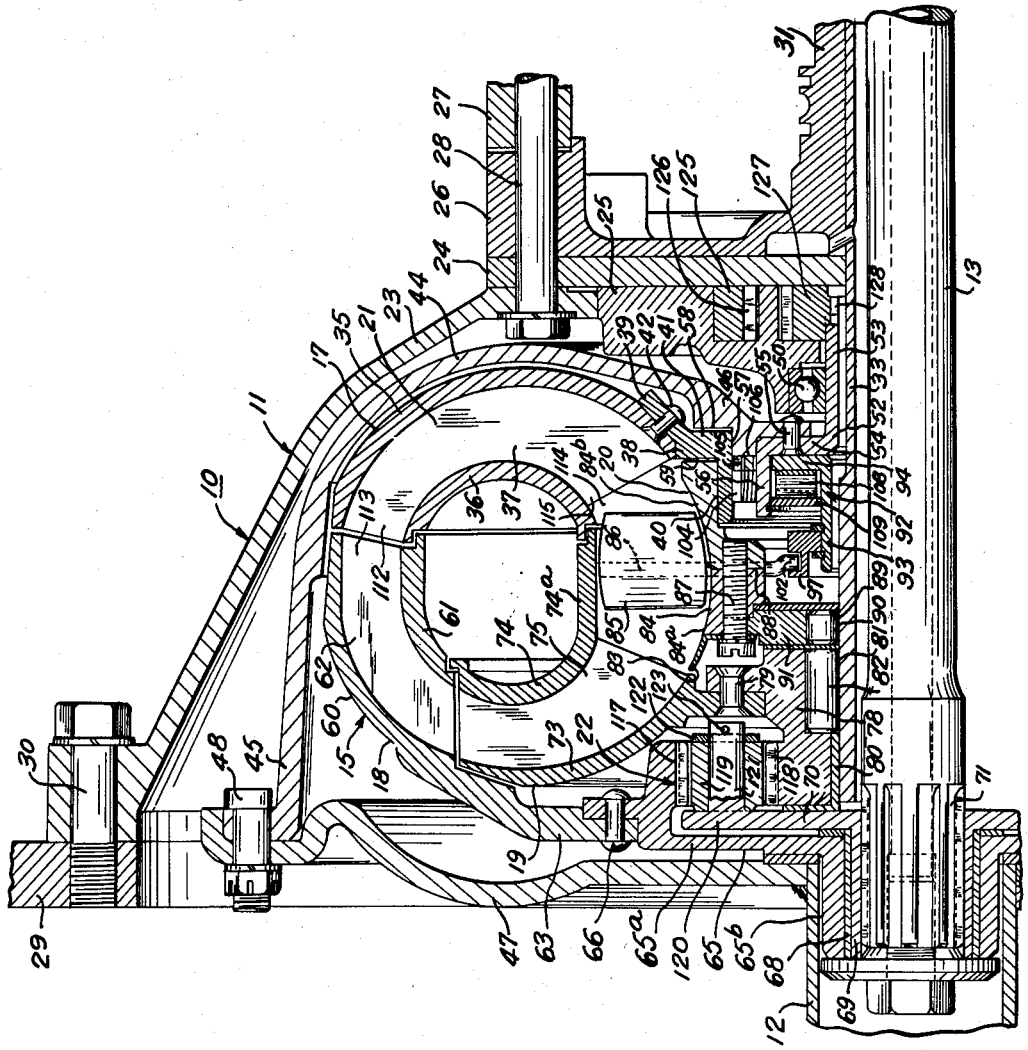
Fig. 1 is a partial vertical axial section taken through a fluid torque converter type of power transmission embodying the present invention, the variable-pitch blade elements being shown in their vehicle cruising or low fluid torque amplification setting.

As representing one practical embodiment of this invention the drawings show the novel transmission mechanism 10 as comprising in general a stationary outer housing 11, a pair of substantially coaxially aligned rotatable power input and power output shaft members 12 and 13, and a torque converter unit 15 rotatable in the housing 11 and about the common axis of the aligned shaft members. The input shaft 12 is a variable-torque power delivery shaft adapted to be driven at different speeds of rotation by a vehicle engine or power unit with which the transmission 10 is associated. The output shaft 13 is suitably connected with the load to be driven, such as with the traction wheels of a vehicle.

The torque converter unit 15 comprises a group of cooperating relatively rotatable bladed annular members 17, 18, 19 and 20 defining a toroidal fluid passage or circuit 21 extending around the common axis of the shaft members 12 and 13. In this group of bladed annular members the member 17 is a pump member, the members 18 and 19 are primary and secondary turbine members which are hereinafter referred to merely as the first and second turbines, and the member 20 is a reaction member. The torque converter unit 15 also comprises mechanical gearing 22 operably connecting the turbines 18 and 19 with the output shaft 13, and which mechanical gearing is preferably in the form of planetary gearing and is here shown as being located within the torque converter unit itself.

The stationary outer housing 11 comprises cooperating housing sections 23, 24 and 25, of which the housing sections 24 and 25 are secured in a connected relation to adjacent housing members 26 and 27 as by means of bolts 28. The housing section 23 is adapted to be connected to an adjacent portion 29 of a vehicle engine or power unit as by means of bolts 30. The housing member 26 includes a central support portion 31 in which a stationary mounting sleeve 33 is fixed with the sleeve projecting therefrom into the stationary housing 11 in surrounding relation to the output shaft 13.

The pump member 17 is a hollow annular member having curved outer and inner walls 35 and 36 and an annular group of blades or vanes 37 extending between the walls and located in the fluid passage 21. The pump member 17 also comprises a central hollow supporting hub or abutment member 38 of a substantially Z-like axial cross-sectional shape and having flange and sleeve portions 39 and 40 connected by an intermediate substantially radially extending connecting or shoulder portion 41. The bladed outer section of the pump member is attached to the annular flange portion 39 of the hub member 38 as by means of the rivets 42.

The pump member 17 is driven from the input shaft 12 in a manner to be explained in detail hereinafter and, for this purpose, a rotatable driving and supporting member 44 is provided in the housing 11 adjacent the pump member. The driving member 44 comprises angularly disposed axial and radial annular portions 45 and 46 connected by a curved intermediate connecting portion, The forward or outer end of the annular axial portion 45 of the driving member 44 is connected to a disc member or flywheel 47 of the input shaft 12 as by means of the connecting bolts 48.

The radial portion or rear end 46 of the driving member 44 is rotatably supported in the stationary housing 11 by an antifriction bearing 50 located in the housing member 25. For thus mounting the radial portion 46 of the driving member 44 in the bearing 50, this member is provided with a central hollow hub member 52 of a Z-like axial cross-sectional shape. The hub 52 comprises an axial sleeve portion 53 surrounding the stationary sleeve 33 and mounted in the bearing 50 and a radial annular connecting portion 54 to which the driving member 44 is attached by means of rivets 55. For a purpose to be explained hereinafter, the hub member 52 is also provided with an annular group of circumferentially spaced fingers or splines 56 carried by the radial portion 54 and extending in a forward axial direction from the latter adjacent the periphery thereof.

The end portion 46 of the driving member 44 is provided with a pair of angularly disposed annular axial and radial surfaces 57 and 58 for supporting and locating cooperation with the rotatable pump member 17. The surface 57 provides a cylindrical axial journal on which the hub 38 of the pump member is rotatably supported. The radial annular face 58 forms a locating surface or thrust bearing for positioning the pump member 17 axially of the torque converter unit 15. For a purpose which will be presently pointed out, the hub 38 provides a cylindrical journal formed by the axial sleeve 40 thereof and a radial locating surface 59 formed by the forward face of the connecting portion 41.

The first or primary turbine 18 comprises a pair of spaced outer and inner curved walls 60 and 61 and an annular group of blades or vanes 62 extending between the walls and located in the fluid passage 21. The turbine 18 includes a radial mounting wall 63 and is rotatably supported by a hub member 65 having a radial flange 65a to which the mounting wall of the turbine is attached, as by means of rivets 66. The hub member 65 includes an axial sleeve portion 65b which is rotatable on a bushing 68 provided on the sleeve portion 69 of a carrier 70.

The carrier 70 forms a part of the mechanical gearing 22 and will be further described hereinafter. This carrier 70 is drivingly connected with the output shaft 13 by a spline connection 71 provided between this shaft and the sleeve portion 69.

The second or secondary turbine 19 comprises outer and inner spaced annular walls 73 and 74 and an annular group of blades or vanes 75 extending between these walls and located in the fluid passage 21. The inner wall 74 of this turbine member includes an axial annular wall projection 74a which extends into an adjacent running relation to the inner wall 36 of the pump member 17. The turbine 19 includes a hub member 78 to which the blade section of this turbine is attached by means of rivets 79. The hub 78 is rotatably mounted on the stationary sleeve 33 by means of a bushing 80 and a one-way brake device 81 comprising an annular group of rollers 82 located between the hub and the stationary sleeve and by which the turbine 19 is held against reverse rotation.

The reaction member 20 comprises an annular curved outer wall 84 spaced from the wall projection 74a of the turbine 19 and an annular group of shiftable blades or blade elements 85 located in the fluid passage 21 and mounted on pivot shafts 86. The outer wall 84 comprises a pair of wall sections 84a and 84b secured together by screws 87 and having cooperating grooved portions forming radial bearings 88 in which the pivot shafts 86 of the shiftable blades 85 are journaled.

The reaction member 20 is supported for rotation about the output shaft 13 by the axial sleeve or journal portion 40 of the hub 38 and by a one-way brake device 89 comprising an annular group of rollers 90. The rollers 90 are disposed between the stationary sleeve 33 and an annular member 91 which is maintained in a connected relation with the wall members 84a and 84b by the connecting screws 87. The one-way brake device 89 holds the reaction member 20 against rotation in a reverse direction. The reaction member 20 is positioned axially of the torque converter unit 15 by cooperation of a filler member 83 with the adjacent end of the turbine 19 and by the cooperation of the adjacent end of the wall member 84b with the radial face 59 of the hub 38.

Driving torque is supplied to the pump member 17 from the hub 52 of the driving member 44 through a torque transmitting means comprising the hub 38 and an axially shiftable control member 92. The control member 92 comprises an axial sleeve portion 93 surrounding the stationary sleeve 33 and a radial flange portion 94 slidably mounted on the axial fingers or splines 56 of the hub 52, the said fingers being a driving means for the control member as well as a supporting means. The flange 94 of the control member 92 is provided with an annular group of circumferentially spaced slots 95 through which the supporting and driving fingers 56 extend as shown in the drawings.

Adjacent the forward or free end thereof, the control member 92 is provided with a shift collar 97 which is mounted on the sleeve 93 by a pair of axially spaced snap rings 98 and 99 engaged in external grooves of this sleeve. The shift collar 97 is provided with an external annular groove 100 facing toward the shiftable blade elements 85 of the reaction member 20. The pivot shafts 86 of the shiftable blades are provided with crank arms 102 which are engaged in the groove of the shift collar 97, such that movement imparted to this collar by an axial control movement of the control member 92 will be effective to swing the blades 85 in one direction or the other about the axes of their pivot shafts, depending upon the direction of the axial movement of the control member.

The driving torque being supplied to the pump member 17 is transmitted thereto through groups of reactively cooperating thrust elements carried by the hub 38 and the control member 92. One group of these reactively cooperating elements comprises an annular group of circumferentially spaced helical teeth or spline elements 104, and the other group comprises an annular group of circumferentially spaced follower elements or gear teeth 105 in meshed engagement with the helical teeth. In this instance, the helical teeth 104 are carried by the hub 38 and comprise an annular row of internal gear teeth or spline elements on the sleeve portion 40.

The follower elements 105 are here shown as comprising an annular row of external gear teeth extending around the periphery of the radial flange 94 of the control member 92. The follower elements 105 are continuously in meshed engagement with the helical teeth 104 but are axially slidable along the latter during axial movements of the control member 92 on the support and driving fingers 56 of the hub 52.

The driving member 44 is provided with an axially facing annular shoulder 106 on the end portion 46 thereof forming a stop at the right hand end of the row of helical teeth 104 and which stop is engageable by the follower teeth 105 when the control member 92 is in its retracted position (shown in Fig. 1) corresponding with a cruising or rest condition of the torque converter unit 15. When the control member 92 is moved to this retracted position, the shift collar 97 acts on the crank arms 102 to cause the pivot shafts 86 to swing the reactor blades 85 to a position extending generally axially of the fluid passage 21 as shown in Fig. 1. This is the position of the blades 85 in which they produce a minimum reaction effect on the turbines 18 and 19 through the fluid stream and represents the pitch setting of these blades when the engine torque being supplied to the pump 17 is of a relatively low value such as during the cruising operation of the vehicle.

The control member 92 is continuously urged toward its retracted position of Fig. 1, corresponding with the low fluid torque amplification setting of the blades 85, by an annular plate spring 108 of a wavy configuration. The spring 108 is disposed between the radial flange 94 of the control member and a spring seat 109 in the form of a radially disposed ring located in the hub 52 and retained therein by a snap ring 110 engaged in an internal groove of the fingers 56.

When the spring 108 is assembled in place against the control member 92, it is in a preloaded condition such that whenever the torque being supplied to the pump 17 is below a predetermined value, this spring will impart an axial control movement to the control member toward the right as seen in Fig. 1, to thereby cause the shift collar 97 to swing the reactor blades 85 to their low reaction setting. This automatic shifting of the blades 85 to their low reaction setting will accordingly take place whenever the torque converter unit 15 is at rest or when the vehicle is being operated at a cruising speed.

Whenever the vehicle is being accelerated, or is being operated under a comparable condition during which a high value of engine torque is being supplied to the pump 17, the helical teeth 104 of the hub 38 will act as an abutment means against which the follower teeth 105 will react and, by reason of the helical position of the teeth 104, the follower teeth will be shifted along the helical teeth toward the left as seen in Fig. 1 by the force of the torque being transmitted. This reaction effect of the follower teeth 105 against the helical teeth 104, causes the control member 92 to be shifted toward the left to thereby swing the blades 85 to the setting shown in Fig. 2 in which they extend more nearly crosswise of the fluid. This crosswise position of the blades 85 is a high fluid amplification setting of the blades in which they have their maximum reaction effect on the turbines 18 and 19 through the fluid stream. When the blades 85 are thus shifted to their high reaction position corresponding with a high value of engine torque being supplied to the pump 17, the turbines 18 and 19 will be driven by the fluid under a condition of maximum fluid torque amplification.

From the construction of the torque converter unit 15 and of the shifting means for the reactor blades 85 as thus far described, it will be seen that these blades are shifted with a modulating action, such that the angular position or pitch setting of the blades will be gradually or progressively varied in accordance with variations in the value of the torque being supplied to the pump 17. It will also be seen that by selecting a suitable pitch angle for the helical teeth 104 and suitable characteristics and loading for the spring 108, the automatic shifting of the blades 85 to their different pitch settings can be made to take place in a desired relation with respect to any selected portion of a characteristic torque curve representing the variable driving torque being supplied to the pump 17 by the vehicle engine.

As shown in Fig. 1, the arrangement of the bladed members 17, 18, 19 and 20 of the torque converter unit 15, is such that the blade groups of these members are in a series relation in the toroidal fluid circuit 21 and are traversed in succession in the order named by the velocity stream of fluid being propelled around the toroidal circuit by the pump 17. In this series arrangement, the discharge portion 112 of the pump 17 is located immediately adjacent the inlet portion 113 of the first turbine 18 and discharges the velocity stream of fluid directly into the latter. The second turbine 19 is located in the series in a position between the first turbibne 18 and the reaction member 20. The discharge end 114 of the reaction member 20 is located immediately adjacent the inlet end 115 of the pump 17.

The torque developed by the turbines 18 and 19 can be delivered to the output shaft 13 by any suitable operative connection provided therebetween and which, in this instance, is represented by the mechanical gearing 22. The gearing 22 is in the form of a planetary gear set comprising a ring gear 117 formed on or carried by the hub member 65 to which the first turbine 18 is connected, and a sun gear 118 formed on or connected with the hub member 78 of the second turbine 19 and located substantially opposite ring gear 117. The mechanical gearing 22 also comprises an annular group of planet pinion gears 119 disposed between, and having meshed engagement with, the ring gear 117 and the sun gear 118.

The above-mentioned carrier 17 supports the planet pinion gears 119 for rotation about the axis of the output shaft 13 and, for this purpose, the radial flange 120 of the carrier is provided with a group of axial pivot shafts 121 on which the pinions 119 are rotatably supported. The pinions 119 are retained on the pivot shafts 121 as by means of suitable washers 122 and associated transverse pins 123. The sun gear 118 is freely rotatable in a forward direction with the turbine 19 but is inhibited against reverse rotation by the one-way brake device 81.

The transmission 10 is here shown as having an auxiliary pump 125 embodied therein for pumping fluid for auxiliary purposes. This pump is of the gear and crescent type and comprises a ring gear 126 rotatable in a pump cylinder provided in the housing member 25 and driven by an external gear 127 in meshed engagement therewith. The gear 127 is driven by the hub member 52 through a toothed connection 128 provided therebetween.

From the accompanying drawings and the foregoing detailed description it will now be readily understood that this invention provides a power transmission of the fluid torque converter type in which blade elements of one of the bladed members of a torque converter unit are shiftable automatically and by a modulating movement to various different positions between two extreme high value and low value reaction settings, in accordance with the value of engine torque being supplied to the pump member of the torque converter unit. It will now also be understood that the present invention provides such automatically shiftable blade elements on the reaction member of the torque converter unit and, since the functioning and advantages thereof have already been described above, they need not be here repeated.

Although the power transmission mechanism of this invention has been illustrated and described herein to a somewhat detailed extent, it will be understood, of course, that the invention is not to be regarded as being limited correspondingly in scope but includes all changes and modifications coming within the terms of the claims hereof.

Having thus described my invention, I claim:

1. In a transmission of the fluid torque converter type; a group of cooperating relatively rotatable bladed annular members defining a toroidal fluid circuit and including pump means, turbine means, and reaction means inhibited against reverse rotation; a variable-torque rotatable power input means; a rotatable power output means; means operably connecting said turbine means with said power output means to drive the latter; said reaction means having blade elements shiftable to different operative positions in said fluid circuit; means mechanically connecting said input means with said pump means for transmitting driving torque to the latter; said mechanical connecting means comprising co-operating torque transmitting members having a control relative movement therebetween of a variable extent in accordance with variations in the torque being transmitted thereby; and means responsive to said control relative movement for shifting said blade elements to said different positions.

2. In a transmission of the fluid torque converter type; a group of cooperating relatively rotatable bladed annular members defining a toroidal fluid circuit and including pump means, turbine means, and reaction means inhibited against reverse rotation; a variable-torque rotatable power input means; a rotatable power output means; means operably connecting said turbine means with said power output means to drive the latter; said reaction means having blade elements shiftable to different operative positions in said fluid circuit; means mechanically connecting said input means with said pump means for transmtting driving torque to the latter comprising reactively cooperating and relatively rotatable torque transmitting members having a control relative movement therebetween in response to variations in the torque being transmitted therethrough to said pump means; and means actuated by said control movement for shifting said blade elements to said different positions.

3. In a transmission of the fluid torque converter type; a group of cooperating bladed annular members relatively rotatable about a common axis and defining a toroidal fluid circuit extending around said axis and including pump means, turbine means and reaction means traversed in the order named by the fluid of said circuit; said reaction means being inhibited against reverse rotation; a variable-torque rotatable power input means; a rotatable power output means; means operably connecting said turbine means with said power output means to drive the latter; said reaction means having blade elements shiftable to different operative positions in said fluid circuit; means mechanically connecting said input means with said pump means for transmitting driving torque to the latter comprising reactively cooperating torque transmitting toothed members in meshed engagement and rotatable about said common axis; said toothed members being relatively rotatable and relatively axially shiftable for producing a control movement along said axis in response to variations in the torque being transmitted therethrough to said pump means; and means actuated by such axial control movement for shifting said blade elements to said different positions.

4. In a transmission of the fluid torque converter type; a group of cooperating relatively rotatable bladed annular members defining a toroidal fluid circuit and including pump means, turbine means, and reaction means inhibited against reverse rotation; a variable-torque rotatable power input means including a drive member provided with spline means; a rotatable power output means; means operably connecting said turbine means with said power output means to drive the latter; said reaction means having blade elements shiftable thereon to different operative positions in said fluid circuit; a pair of relatively cooperating abutment and control members mechanically effective to transmit torque therethrough to said pump means and one of which pair of co-operating members is connected with said pump means and the other of which pair of co-operating members is driven by said spline means; said other member having a control movement relative to said one member and along said spline means responsive to variations in the torque being transmitted through said pair of members; and means actuated by said control movement for shifting said blade elements to said different positions.

5. In a transmission of the fluid torque converter type; a group of cooperating bladed annular members relatively rotatable about a common axis and defining a toroidal fluid circuit extending around said axis and including pump means, turbine means and reaction means traversed in the order named by the fluid of said circuit; said reaction means being inhibited against reverse rotation; a variable-torque rotatable power input means; a rotatable power output means; means operably connecting said turbine means with said power output means to drive the latter; said reaction means having blade elements shiftable in said fluid circuit to various operative positions between a high fluid torque amplification setting and a low fluid torque amplification setting; a pair of reactively and mechanically co-operating abutment and control members effective to transmit torque therethrough to said pump means and one of which is connected with said pump means and the other of which is driven by said input means; said control member being movable relative to said abutment member and having a control movement in one direction in response to an increase in the torque being transmitted to said pump means; spring means effective on said control member for causing a control movement thereof in the other direction in response to a decrease in the torque being transmitted to said pump means; and means responsive to the control movement of said control member in said one direction for shifting said blade elements toward said high amplification setting and responsive to the control movement in said other direction for shifting said blade elements toward said low amplification setting.

6. A transmission comprising; cooperating relatively rotatable bladed annular members defining a toroidal fluid circuit and including pump means, turbine means and reaction means; rotatable power input means; rotatable power means; means inhibiting reverse rotation of said reaction means; means operably connecting said turbine means with said output means to drive the latter; said reaction means having blade elements shiftable in said fluid circuit to various positions between a high fluid torque amplification setting and a low fluid torque amplification setting; means for transmitting torque from said input means to said pump means comprising a pair of mechanically co-operating relatively rotatable members one of which is connected with said pump means and the other of which is driven by said input means; one member of said pair having helical thrust elements thereon and the other member having follower elements cooperating with said helical elements; one member of said pair being a control member having an axial control movement produced by the rotative cooperation of said helical and follower elements in response to variations in the torque being transmitted to said pump means; and means responsive to said control movement for shifting said blade elements to different positions between said high and low torque amplification settings.

7. A transmission comprising; cooperating relatively rotatable bladed annular members defining a toroidal fluid circuit and including pump means, turbine means and reaction means; rotatable power input means; rotatable power output means; means inhibiting reverse rotation of said reaction means; means operably connecting said turbine means with said output means to drive the latter; said reaction means having blade elements shiftable in said fluid circuit between a high fluid torque amplification setting and a low fluid torque amplification setting; means for transmitting torque from said input means to said pump means comprising a pair of mechanically co-operating relative rotatable members one of which is connected with said pump means and the other of which is driven by said input means; one member of said pair having helical thrust elements thereon and the other having follower elements cooperating with said helical elements; one member of said pair being a control member having an axial control movement in one direction produced by the rotative cooperation of said helical and follower elements in response to an increase in the torque being transmitted to said pump means; spring means effective to produce an axial control movement of said control member in the other direction in response to a decrease in the torque being transmitted to said pump means; and means responsive to the control movement of said control member in said one direction for shifting said blade elements toward said high torque amplification setting and responsive to the control movement in said other direction for shifting said blade elements toward said low torque amplification setting.

8. A transmission comprising; cooperating relatively rotatable bladed annular members defining a toroidal fluid circuit and including pump means, turbine means and reaction means; rotatable power input means including a drive member provided with spline means; rotatable power output means; means inhibiting reverse rotation of said reaction means; means operably connecting said turbine means with said output means to drive the latter; said reaction means having blade elements shiftable to various positions between a high value fluid reaction setting and a low value fluid reaction setting; means for transmitting torque from said input means to said pump means comprising a pair of mechanically cooperating relatively rotatable members one of which is an abutment member connected with said pump means and having helical thrust elements thereon and the other of which is a control member driven by said spline means and having follower elements cooperating with said helical elements; said control member having an axial control movement along said spline means in one direction produced by the cooperation of said helical and follower elements in response to relative rotation between said pair of members produced by an increase in the torque being transmitted to said pump means; spring means effective on said control member for causing an axial control movement thereof in the other direction in response to a decrease in the torque being transmitted to said pump means; and means responsive to the control movement of said control member in said one direction for shifting said blade elements toward said high reaction value position and responsive to the control movement in said other direction for shifting said blade elements toward said low reaction value position.

9. A transmission as defined in claim 8 which includes a shift collar connected with said control member; and in which said blade elements are swingable by pivot shafts having arm portions engaging said shift collar.

References Cited in the file of this patent
UNITED STATES PATENTS

| | | |
|---|---|---|
| 2,327,647 | Jandasek | Aug. 24, 1943 |
| 2,420,429 | Jandasek | May 13, 1947 |
| 2,795,152 | Russell | June 11, 1957 |

FOREIGN PATENTS

| | | |
|---|---|---|
| 444,171 | Great Britain | Mar. 16, 1936 |

UNITED STATES PATENT OFFICE
CERTIFICATE OF CORRECTION

Patent No. 2,944,402

July 12, 1960

Robert C. Russell

It is hereby certified that error appears in the printed specification of the above numbered patent requiring correction and that the said Letters Patent should read as corrected below.

Column 8, line 21, after "power" insert -- output --.

Signed and sealed this 3rd day of January 1961.

(SEAL)
Attest:
KARL H. AXLINE
Attesting Officer

ROBERT C. WATSON
Commissioner of Patents